United States Patent
Stroke

[11] 3,785,262
[45] Jan. 15, 1974

[54] OPTICAL APERTURE SYNTHESIS

[76] Inventor: George W. Stroke, 23 Southgate Rd., Setauket, N.Y. 11790

[22] Filed: Dec. 9, 1969

[21] Appl. No.: 883,534

[52] U.S. Cl................. 95/18, 95/12.5, 350/3.5, 95/36
[51] Int. Cl..................... G03b 35/02, G03b 35/08
[58] Field of Search.................. 95/12.5, 18, 36; 350/3.5

[56] References Cited
UNITED STATES PATENTS

| 3,605,593 | 9/1971 | Anderson | 95/18 |
| 3,556,630 | 1/1971 | Wilczynski | 350/3.5 |
| 3,435,743 | 4/1969 | Craig | 95/12.5 |
| 2,969,005 | 1/1961 | Blackstone | 95/12.5 |

Primary Examiner—John M. Horan
Attorney—Spencer E. Olson

[57] ABSTRACT

There is disclosed a method and apparatus for synthesizing large-aperture optics by exposure of a single photographic plate either successively or simultaneously through small-aperture optics. The technique represents the extension of the "synthetic-aperture radio telescope" principle to the optical domain by the relatively simple photographic synthesis of a "high-resolution" image in a single photograph, exposed either successively through sets of small "low-resolution" apertures sucessively placed to generate the spatial frequency components of the desired large aperture, or exposed simultaneously through a set of small "low-resolution" apertures having such optical characteristics and being so arranged as to generate the spatial frequency components of the desired large aperture.

16 Claims, 16 Drawing Figures

PATENTED JAN 15 1974

INVENTOR.
GEORGE W. STROKE

BY

ATTORNEY

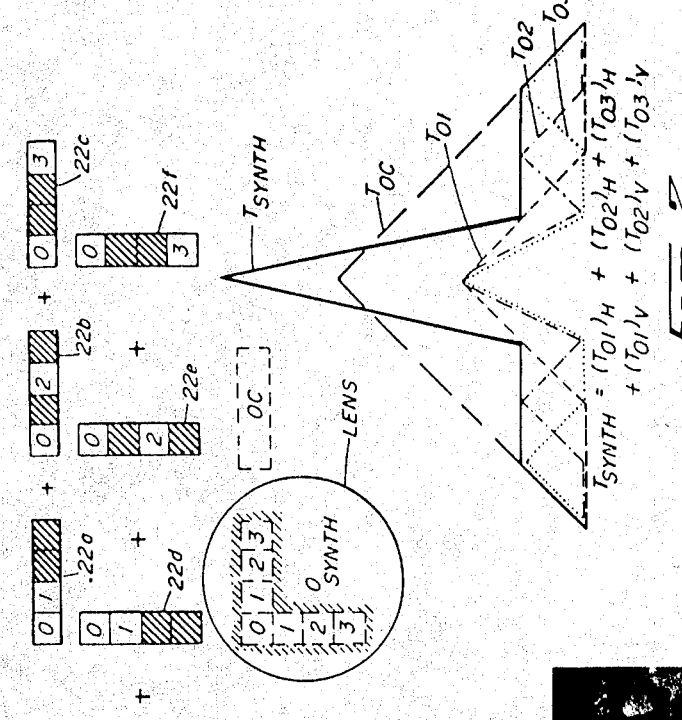
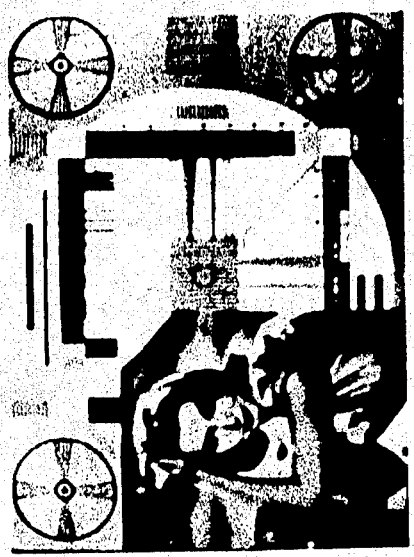
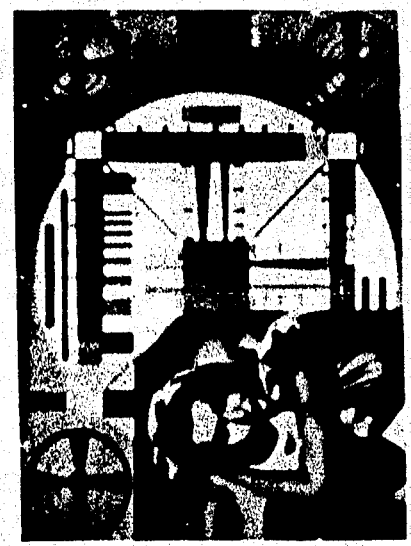

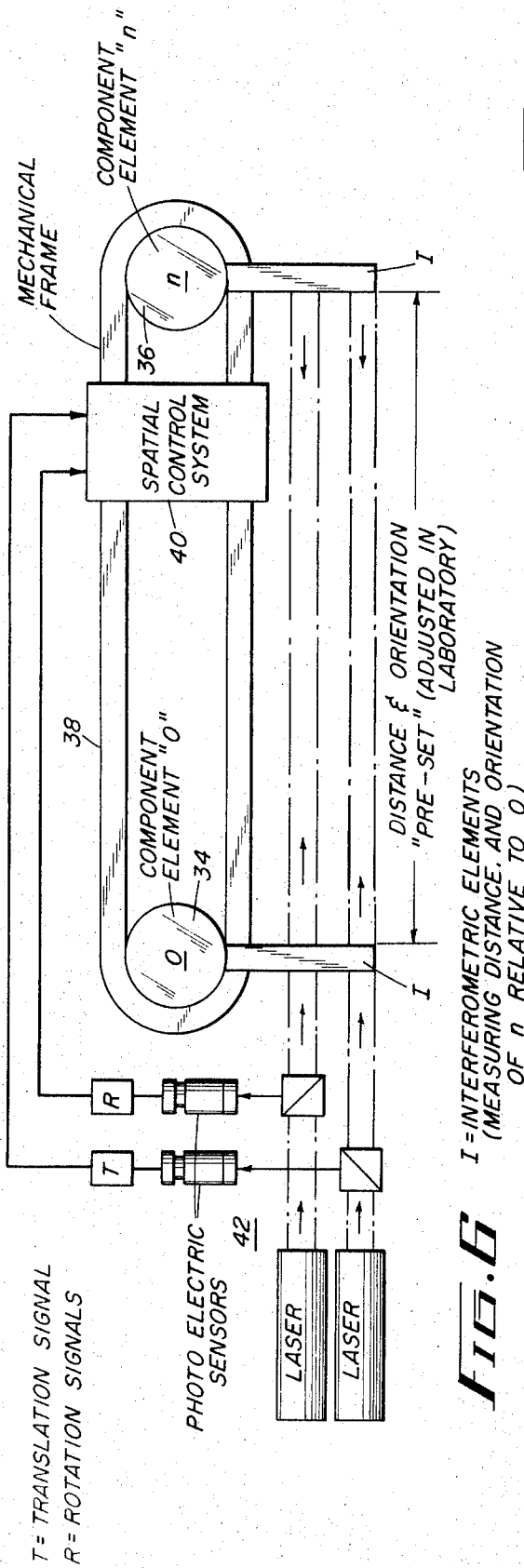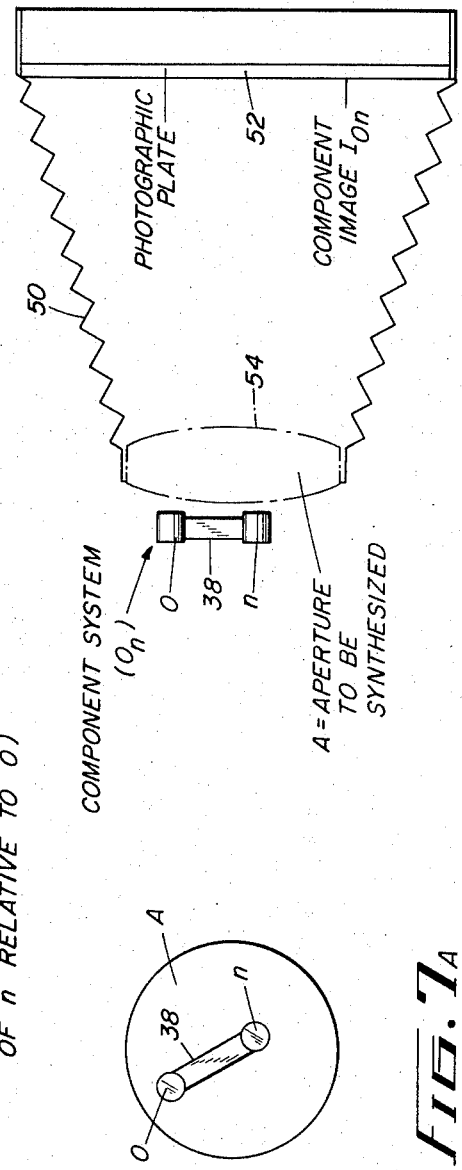

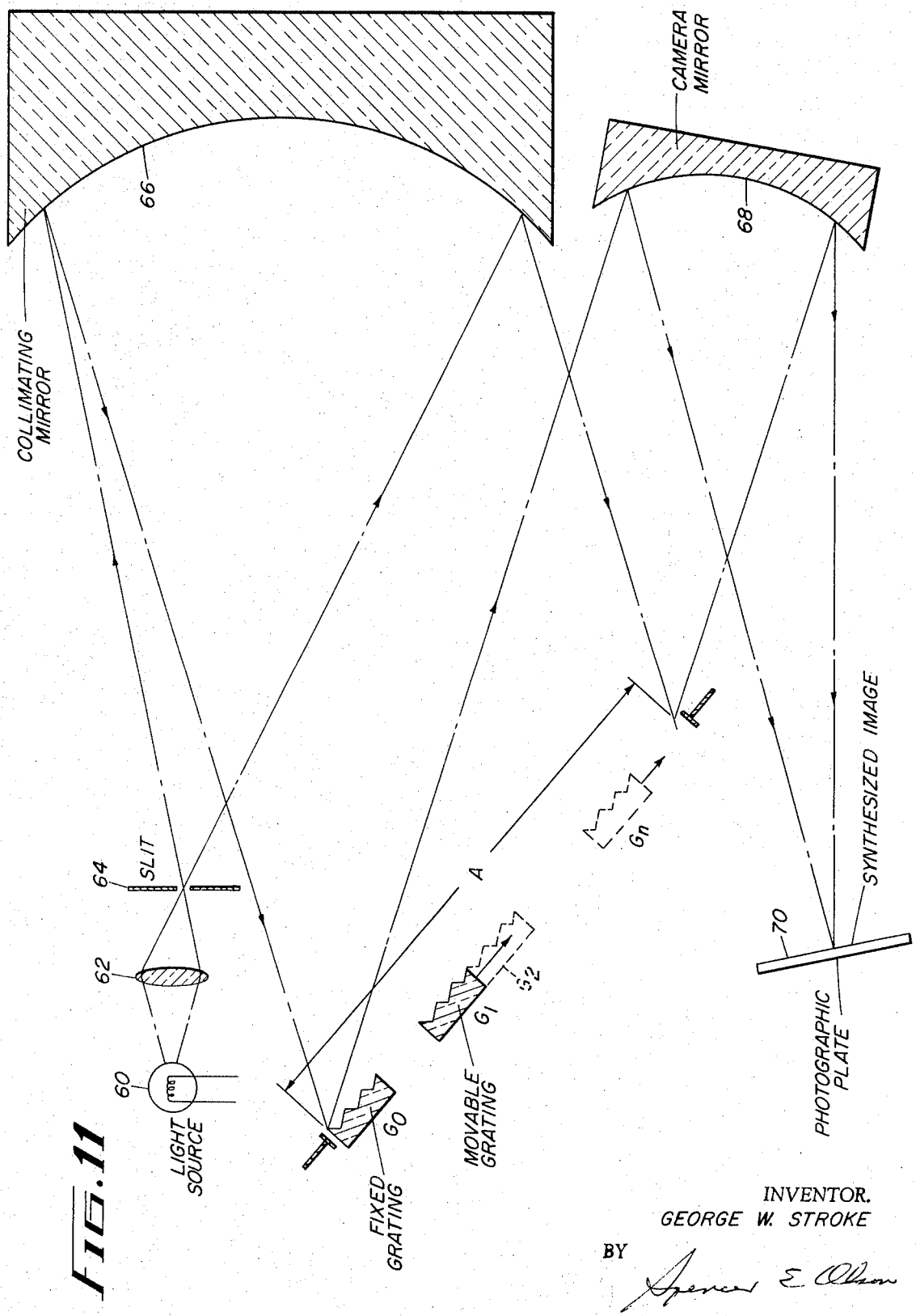

OPTICAL APERTURE SYNTHESIS

BACKGROUND OF THE INVENTION

Very considerable attention has been devoted in recent years to possibilities of transposing into the optical domain the aperture synthesis principle first described in radio astronomy by Sir Martin Ryle and his colleagues. This principle, which is summarized in Microwaves Scanning Antennas, Volume I, R. C. Hansen, Editor, Academic Press, New York, 1964, consists of using a pair of small antennas and moving one of them relative to the other in such a way as to successively sample the currents induced by a radio source which would have existed in each of the elements of a hypothetical array of large physical extent. The required synthesis is achieved with the aid of electronic digital computers. In effect, the method replaces the problem of large antenna construction with one of computation.

By way of general background for appreciating the nature and significance of the invention, reference is also made to the now famous radio-astronomical image-synthesis method known as the "Culgoora Annular-Aperture Radioheliograph", pioneered by J. Paul Wild by showing how an "on-line" electronic analog computation method may be used to synthesize an image of the sun which would have been obtained by a full-filled aperture, in the case when the images (a 3,000 point array, imaged almost simultaneously) are acutally obtained through only an annular aperture. See, for example, J. P. Wild, Preceedings of the Royal Society (London) A286 (1965) 499. Although not directly related to the Ryle aperture synthesis method, the Wild radio-astronomical method may be considered either as an "aperture synthesis" or as an "image deconvolution" method.

It should be observed, however, that radio telescopes are not image-forming systems as such--there are no photographic plates in radio telescopes--so of necessity, if images are to be obtained with a radio telescope, they must be put together with the aid of computers. Also, in radio telescope imaging, only a very small number image points are dealt with. For example, in a radio telescope used on the sun, not more than fifty image points are imaged at one instant of time, and then this line of fifty points is scanned to build up a 3,000-point array in one second. In a photographic image, on the other hand, where a photographic plate may have a resolution of one hundred lines per millimeter, there are 10,000 image points for each square millimeter on the photograph. Thus, if one goes to a ten millimeter photograph, there are a million points, and the number goes up literally astronomically with increased photograph size, so that the time to assemble a large picture with the aid of a computer in an image synthesis application has been estimated to be two months' computation time per picture. This is prohibitively long to be practical, but it does show a recognition that the radio-astronomical approach using computers could be, at least theoretically, transposed to the optical domain.

The interest in extending these radio astronomy principles to the optical domain stems from the need for photographic systems having large focal lengths, for use in aerial photography for example, be it from an airplane or a satellite, or in astronomy, where the large focal length is needed to sufficiently enlarge the image. However, to maintain a ratio of aperture diameter to focal length to give satisfactory resolution, that is, to keep the width of the "spread function", which is equal approximately to $f\lambda/D$, to sufficiently low value, say a few wavelengths, it is necessary that the diameter of the aperture be correspondingly large. For example, if it is necessary to have a focal length of ten meters, the aperture diameter of the optical system would have to be five meters for a "spread function" of two wavelengths. Remembering that the largest telescope lens in existence has a diameter of 200 inches (about five meters), and that photographic systems require the use of well-corrected lens systems--not the mirror systems used in astronomy--it becomes obvious that an optical system having focal lengths of the order of magnitude suggested above are not practically realizable, certainly not for airborne use. Moreover, it is virtually impossible to melt the large volume of special glass required to make a well-corrected large diameter lens, which may actually require as many as eight or ten individual lens elements. In short, not only is it virtually impossible to fabricate optical lenses having the necessary diameter and quality, and even if they could be fabricated, their size and weight would prohibit their being carried aloft.

Others have attempted to extend to the optical domain the remarkable advantages of the Ryle "radio-astronomical aperture-synthesis" principle, but the proposals to date of which applicant is aware require either extensive and very lengthy electronic digital Fourier-transform computation methods, or, attempt to synthesize the final image with the aid of the holographic intensity-superposition method described by Dennis Gabor, applicant and others in Physics Letters 18, 116 (1965). Both of these proposals, the latter by J. S. Wilczynski, are described by him in IBM Research Report RC-1988 entitled "A Double Objective Telescope With Common Focus (Synthetic Aperture Optical Telescope)" Mar. 13, 1968. Quite apart from the estimated two months' computer time required to assemble a photograph by the first method, the quality would no doubt be poor compared to what is really wanted. As for the holographic intensity-superposition method, the present state of the art of holography lacks, by orders of magnitude, the capability of providing the required resolution for high-resolution photography.

In addition to the yet unsatisfactorily resolved problem of putting together the partial resolution pictures possibly obtainable with the Wilczynski proposals, there is the further hurdle that if one were to attempt to synthesize the equivalent of a large high-resolution complicated lens, the small components used for the synthesis--by placing them successively in positions so as to cover the area which would be occupied by the large lens, for example--must be placed with a precision comparable to that with which the lens elements themselves are positioned in the large single lens. In optical terms, this means wavelength precision; namely, tolerances of the order of 1/100,000th of an inch, extremely difficult, if not impossible to maintain in systems where the lens components are successively moved to sweep our the large area of the lens to be synthesized.

In view of the above-outlined shortcomings of prior attempts to synthesize large-aperture optics, it is an object of the present invention to provide a relatively simple direct synthesis of large-aperture optics.

Another object of the invention is to provide a method and apparatus capable of synthesizing a posteriori substantially the equivalent of the image which would be obtained by large-aperture optics in situations where only small-aperture optics may be useable.

SUMMARY OF THE INVENTION

Briefly, a high-resolution "full spatial-frequency range" optical image may be synthesized, according to the invention, by superposing in a single photographic plate a suitable set of low-resolution partial frequency-range photographs, obtained either separately or simultaneously. The principle has been experimentally verified with the aid of a set of suitable "masking" apertures, placed successively in front of a single 'large-aperture' "full frequency range" photographic lens, and exposing a single photographic plate successively to the set of 'low-aperture' "partial frequency-range" component images. The resulting image is essentially equivalent to that which would be obtained by the 'large-aperture' "full frequency-range" lens. By 'large-aperture' it is meant that the ratio $D/f$ is large, of the order cited in the above illustration.

Another important aspect of the invention is the embodiment of this new principle of optical aperture synthesis for increasing a posteriori the resolution obtainable through each of a number of small-aperture objectives when used alone, in practically realizable systems which physically implement the effect observed in the experimental verification; namely, the design of component optical elements which function as if they were elements of the large aperture to be synthesized, while satisfying the extreme tolerance constraints alluded to earlier. Unlike previous proposals in which it was necessary to move at least one lens component successively to sweep out the large area of the lens to be synthesized, in accordance with this invention a number of component sub-systems (as many as may be required to synthesize a given aperture) are preassembled to the required tolerances and fixedly placed relative to each other in position in a camera or other optical system. The several component systems, of which each part has both the power and the prismatic effect corresponding to that region of the large aperture lens it is to simulate, each takes a partial-resolution photograph, which are superposed in a single photograph, either directly--by successive exposures through the individual component systems, or by simultaneous exposure through all of them--or by combining several separate component images by known photographic processing techniques. Thus, it is not necessary that the individual component sub-systems operate one after another as in the case of prior art dynamic systems.

The principles of the invention are not limited, however, to static systems, but may also be embodied in dynamic systems by avoiding some of the difficulties of the known dynamic systems. For example, the concept may be employed to synthesize a large aperture diffraction grating by using one fixed grating element and moving another grating element in a carefully controlled manner relative thereto.

DESCRIPTION OF THE DRAWINGS

Other objects, features and advantages of the invention will become apparent, and a better understanding of its construction and operation will be had, from the following detailed description taken in conjunction with the accompanying drawings, in which:

FIG. 2 is the modulation transfer function curve of an elementary component aperture, and FIG. 2A is a photograph of a test object photographed through the aperture;

FIG. 3 are modulation transfer function curves for a plurality of sets of pairs of component apertures, and FIG. 3A is a synthesized photograph of the same test object obtained by exposing a single photographic plate successively through the sets of pairs of component apertures;

FIG. 6 is a diagrammatic plan view of a preassembled component system having two optical elements;

FIG. 7 is a diagrammatic elevation view of a camera in combination with one component system of the type illustrated in FIG. 6;

FIG. 7A is a front view of the aperture of the camera of FIG. 7;

FIG. 11 is a ray diagram illustrating a dynamically synthesized aperture; and

DESCRIPTION OF THE PREFERRED EMBODIMENT

Briefly summarizing what has been said earlier, the invention consists simply in superposing several small-aperture "partial frequency range" component images directly in a single photographic plate. The result is an image equivalent to that which would be obtained by the large-aperture "full frequency range" optical system. A significant aspect of the invention resides in the recognition not only that the "synthetic-aperture radio telescope" principle can be extended to the optical domain, but that it can be demonstrated in the laboratory without the necessity for building a physical system to verify the principle, to thus avoid the several hundred thousand dollars estimated cost of such experimental apparatus. Applicant has verified the principle simply with the aid of a set of masking apertures, used successively in front of a single 'large-aperture' "full frequency range" photographic lens, and exposing a single photographic plate successively to the set of 'low-aperture' "partial frequency range" component images. In other words, a model was used to demonstrate the new optical principles involved, without having to resort to the rigorously accurate positioning of a movable small aperture relative to a fixed aperture, which may otherwise have been required to demonstrate the principle.

Figure 1:
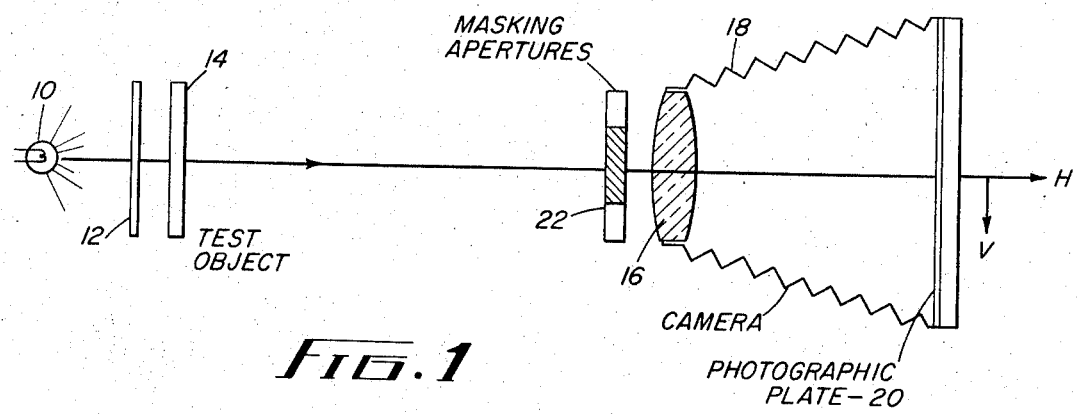
FIG. 1 is a schematic diagram of the experimental arrangement used to verify the principle of "aperture synthesis" by superposition of component "small-aperture" images in a single photographic plate.

The experimental arrangement used is shown schematically in FIG. 1, in which light from a white-light source 10 is successively projected through a ground glass 12, a test chart 14, a set of masking apertures successively placed in front of the lens 16 of a camera 18 having the usual photographic plate 20. One of the masking apertures is shown at 22.

The principle was verified by first photographing a test chart through an elementary component aperture, in this case a 1 millimeter square opening in the mask, whose "modulation transfer function" (MTF), $T_o$, which is equal to the auto-correlation function of the field produced by a monochromatic source in the exit pupil of the aperture, is shown adjacent the aperture. The image, about 13 millimeters wide, was obtained in ordinary incoherent light from a 90 millimeter wide test chart, using an $f = 240$mm Schneider lens. An enlarged print of this image appears in FIG. 2A.

The next step in the experiment consisted of exposing a single photographic plate successively through sets of pairs of component apertures of the form shown in FIG. 3. More particularly, successive exposures were made, first through the mask 22a which covered the entire lens except for the clear areas designated "0" and "1", each of which were 1mm square, next through mask 22b which masked the entire lens except for the clear areas "0" and "2", and then through the clear areas designated "0" and "3" in the mask designated 22c. It will be noted that the apertures in these three cases are spaced in the horizontal direction. Thereafter, three additional exposures were successively made with the mask oriented with the apertures spaced in the vertical direction as schematically represented by masks 22d, 22e and 22f. The mask was so constructed that the six successive exposures were, in effect made through the inverted L-shaped aperture positioned relative to the lens as shown in the lower left-hand portion of the figure. None of the small apertures in the masks was larger than the elementary component aperture used in obtaining the "low-resolution" photograph of FIG. 2A. The MTF functions $T_{01}$, $T_{02}$, $T_{03}$, etc., shown in the lower right-hand portion of the figure correspond to the horizontal components. The MTF function $T_{oc}$, included for comparison purposes, corresponds to the horizontal slit OC (shown in dotted lines) having dimensions corresponding to the horizontal slit comprising component apertures 0, 1, 2 and 3. The enlarged print of the synthesized image obtained by successively exposing a single photographic plate in the manner described is shown in FIG. 3A.

Comparing FIGS. 2A and 3A, the photograph obtained through the small component aperture shows that not one of either the horizontal or vertical bars in the test photograph could be resolved by this small aperture. Also, it will be observed that the halftone photograph of the model appears unsharp as if it had somehow been degraded. On the other hand, the synthesized photograph of FIG. 3A shows remarkably well resolved test bar patterns, both horizontal and vertical, not only in the center, but also in the circled sections in the corners. Additionally, it may be seen that the half-tone image is considerably sharper than in FIG. 2A, and also that letters on the chart have become readable, which are not in FIG. 2A. Although not illustrated in the drawing, when the synthesized image of FIG. 3A was compared with an image taken through the "full-aperture" OC, it was observed that the synthesized image is comparable in spatial-frequency resolution and contrast to the "full-aperture" image to a remarkable degree. These photographic results were reproduced with comparatively high-contrast paper (Kodabromide F4) for printing purposes; however, a comparatively low-contrast test chart was deliberately used in order to maintain the superposition of the six component photographs within the linear part of the logarithmic exposure curve. It should be noted that although the principle was verified by successively exposing a single photographic plate through sets of pairs of component apertures, in practice, as will be seen later, the component photographs may be taken simultaneously, or successively, as a given application may require.

It should be noted also that the mask configuration of FIG. 3 giving a synthesis corresponding to only a full horizontal and a full vertical aperture, is by way of illustration only. Indeed, in this case, if the picture were taken through an aperture masked only to the full horizontal and vertical slit, the horizontal and vertical bars would be resolved, but not other features. The resolution of FIG. 3A would be even better if other pairs of apertures had been used to additionally synthesize that part of the aperture which is required to resolve spatial frequency components which are at some angle with the horizontal or vertical components. Such a synthesis even more strikingly brings out the features in the half-tone model, as well as, of course, in characters such as those appearing in other parts of the photograph. That this is the case has been verified by superposing in the same photograph a multiplicity of images of the same chart taken successively through a slit rotated into various angular positions in front of the camera lens.

It will be appreciated that through the use of the described masks, the successive exposures were each made through a pair of elemental regions of the camera lens, with each of the pairs having the elemental area "0" in common. It follows, therefore, that if a number of optical component systems, each including at least two lens elements having optical properties corresponding to the elemental regions of the "real" lens could be fabricated and positioned in the same relative locations as the elemental regions of the "real" lens, then it would be possible to synthesize the "large-aperture" lens with a number of such component systems which, in the aggregate, need not fully occupy the entire area occupied by the "real" lens.

The principle of synthetic aperture optics, or image synthesis by synthesized apertures, may be most readily explained in mathematical terms, as has been done by applicant in his paper entitled "Synthesis of Large-Aperture Optics by Successive Exposure of a Single Photographic Plate Through Successively Placed Small-Aperture Optics", Optics Communications, Vol. 1, No. 6, pp. 283–290, 1970. However, the main elements of the principle may be explained qualitatively with the aid of the well known Young two-slit interferometer illustrated in FIG. 4. In this figure, L represents a well-corrected lens system having a diameter equal to the aperture A to be "synthesized", and is shown as being covered with two narrow slits spaced apart a distance $2d$. For simplicity, it will be assumed that the width $w$ of the slits is small compared to the spacing of the slits. It is to be noted that the slits are positioned unsymmetrically relative to the lens L.

Consider now a single point No. 1 in the object space to the left of the lens: the image of this point produced in the focal plane of the lens system L is the well known two-slit interference pattern consisting, in the final analysis, of a sinusoidal intensity distribution in the image plane having a spacing $\lambda/2d\, f$.

Now let it be assumed that there is another point No. 2 in the object space incoherent with point No. 1, such that its image has the same sinusoidal interference pattern but displaced precisely by one period compared to the interference pattern produced by point No. 1. These two interference patterns originating from incoherent object points will thus add in intensity, and the resulting interference pattern will, for all practical purposes, resemble that produced by a single point to an undistinguishable degree. The same pattern superposed on the previous two in intensity will be produced by a third point spaced by one further unit, namely, M $\lambda/2d\, f$, (where M is the magnification of the lens system) along the axis in the object space, and so on, for additionaly similarily spaced points. It can readily be shown that the preceeding superposition for objects at infinite distance from the lens, as an example, holds not only for points but, indeed, for lines perpendicular to the plane of the paper. The corresponding interference images are then corresponding lines (strictly speaking, hyperbolae) according to well known classical optics.

A final part of the analysis of the illustrated two-slit system consists in noting that the system will image in the form of a sinusoidal interference fringe pattern an object which itself consists of a sinusoidal intensity distribution. It may therefore be concluded that the two-slit arrangement, together with the lens L, images "perfectly" an object consisting of a sinusoidal intensity distribution having a spacing corresponding to the illustrated interference pattern. Strictly speaking, of course, the spacing of the intensity distribution in the object is related to the spacing of the intensity distribution in the interference fringe pattern (i.e., the image of the object) by the magnification of the lens system used. In the strictest sense, the analysis is applicable to the "local" description of the object-image relationship in terms of 'spatial frequencies'.

The analysis may now be extended to the formation of images by the system L masked with other slits having a different orientation or spacing. Each of such additional systems used separately, as an example, is therefor capable of imaging "perfectly" a sinusoidal intensity distribution in the object space corresponding to its spacing and orientation. The analysis can be further extended to the imaging of halftone objects or scenes by simply noting that it is well known in optics that the intensiy distribution (somethimes known as brightness or luminance distribution) in an object or scene may be considered as a superposition of intensity distributions in a set of component sinusoidal intensity distributions suitably weighted in amplitude and suitably placed relative to each other. In other words, one may describe any commonly encountered intensity or brightness distribution in an optical scene in terms of the spatial Fourier superposition of sinusoidal intensity distributions of different frequencies and orientations. This Fourier superposition applies, of course, to each particular object region in the same mathematical way, it being understood, however, that each object region will have a different Fourier expression corresponding to it. This difference is precisely that which characterizes the difference in what we consider to be the image of a particular region.

In more physical terms, the two-slit "mask" automatically sorts out in each of the images the suitable spatial frequency component which characterizes the different object regions containing such spatial frequency components. This is readily demontrated by the classical optics experiment of looking at the object through such a component aperture system; one sees painted on the object, as it were, little grating-like components all having the same frequency and orientation, more or less intense, however, depending on the content of the particular object region of that particular spatial frequency. The results of this experiment are most striking when a test chart of varying frequencies is observed through a two-slit system, as was used for illustration in applicant's above-referenced paper, because one observes that none of the frequencies in the test chart are observable except those which correspond to the frequency selected by the particular spacing and orientation of the two-slit masking aperture.

The preceding description of a model indicates that component systems for synthesizing an aperture or image must have at least two apertures spaced from each other. In practice, the apertures are achievable not only with the aid of slits, but also, as will be described later, with the aid of small component apertures which may be circular, rectangular, triangular, square or any desired shape. While it is clear that two is the minimum number of apertures required in order to get the spatial frequency components of different spacings, in some practical cases it may be desirable to use apertures of different types; for example, one large aperture and one small aperture, or two or three apertures suitably placed to sort out appropriate subregions or partial frequency regions in a more effective way than is achievable by the simple two-aperture arrangement used for illustration purposes.

Figure 5:
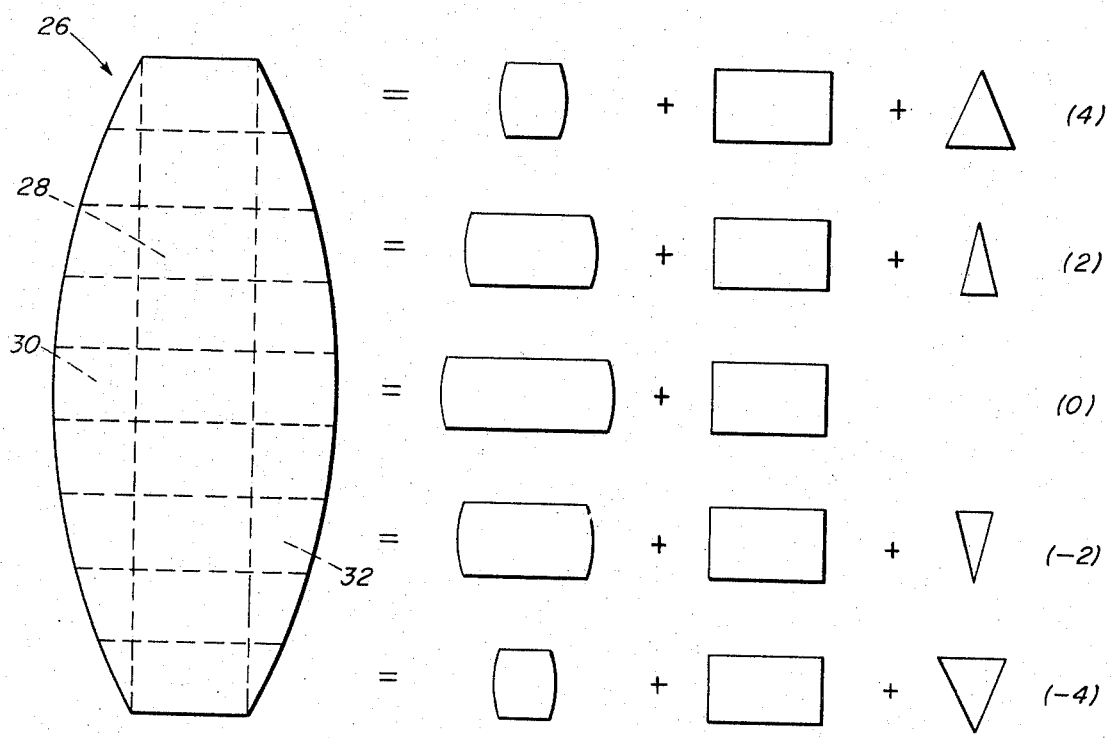
FIG. 5 is a diagrammatic illustration of how a large-aperture lens can be visualized as consisting of a multiplicity of small component lens systems.

As was suggested earlier, the successive exposures through different masks in the experimental verification described above may be considered as having been made through respective pairs of elemental regions of the camera lens, with each of the pairs having the elemental region "0" in common, and that if optical component systems each including two lens elements having properties corresponding to these elemental regions could be fabricated and positioned in the same relative positions, then a "large-aperture" lens could by synthesized. How this may be realized in practice is diagrammatically suggested in FIG. 5 wherein the lens 26 maybe visualized as being made up of a multiplicity of elements which, indeed, many optical systems, including lenses, are. For example, the lens having the cross sectional shape shown may be regarded as consisting of a central slab 28 having parallel planar surfaces having two other glass elements 30 and 32 cemented to these surfaces. The lens can be further "fragmented" by "slicing" it in spaced horizontal planes as indicated, such that the central horizontal section can be regarded as comprising two lens elements having curvatures corresponding to the curvature of the "real" lens and a flat piece of glass corresponding in dimensions to the central vertical slab 28, as indicated at (0). Similarly, a horizontal section at an edge of the "real" lens may be regarded as including a lens element of a given curvature, a flat piece of glass, and a prism having angles which in combination with the other two elements gives the otpical equivalent of this elemental region of the lens. The shape of the elements required to give the optical equivalent of other regions of the lens are also shown.

It will be recognized, of course, that fabrication of component systems having optical characteristics corresponding to an elemental portion of a lens, for example, requires the use of well-corrected elements, for without well-corrected elements it is impossible to produce a well-corrected system, which, in turn, is necessary to satisfy the wavelength tolerances alluded to earlier. That is, care must be taken to insure that the individual lens components of each partial system are ground, polished and assembled suitably off-axis, all in accordance with known standard optical manufacturing methods.

As indicated by the foregoing quantitative explanation of the principle, the individual component systems must each include at least two lens elements (fabricated as suggested in connection with FIG. 4) and, in accordance with an important aspect of the invention, are preassembled as a unit to establish the correct spacing and relative alignment of the elements to faithfully represent the elemental regions of the lens to which they correspond. For example, as shown diagrammatically in FIG. 6, a pair of small lens elements 34 and 36, further designated "0 " "and n", respectively, each of which may consist of a number of optical elements as described above, may be supported in a common plane by a suitable mechanical frame 38 fabricated from a suitably rigid, yet lightweight, material. The frame preferably includes as an integral part a piezoelectric or similar spatial control system 40, operative in response to signals from a laser photoelectric interferometer system, diagrammatically illustrated at 42, for maintaining the "required" spacing and orientation of element "0" relative to element "n". Detector and transducer systems capable of maintaining the desired spacing and alignment to the required tolerances have been used in other optical systems and are known to the art; for example, as described by applicant when discussing interferometric servo-control in his article on "Diffraction Gratings" pp. 420–750 in Vol. 29, HANDBUCH DER PHYSIK (Editor: S. Flugge, Publisher: Springer Verlag, Berlin and Heidelberg, 1967). It can be shown mathematically, for example, that a tolerance in the spacing between the two elements 20X larger than the wavefront tolerance is acceptable for an $f/10$ system. Thus, if the tolerance of the individual elements is one wavelength, for example, it is necessary to maintain a tolerance in the spacing between elements "0" and "n" of twenty wavelengths, or approximately 1/10,000 inch, well within the capabilities of the art.

Figure 4:
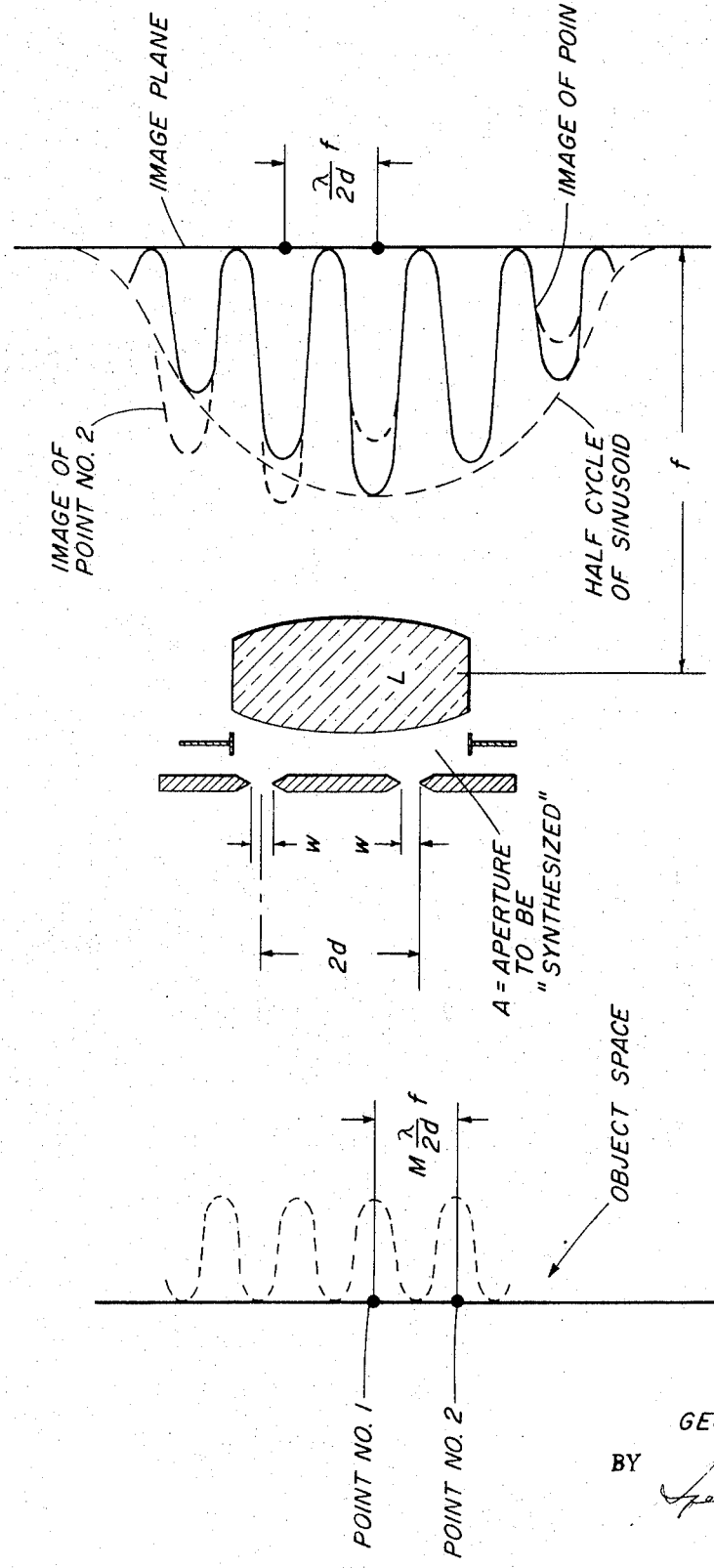
FIG. 4 is a shcematic diagram illustrating the Young principle of "two-slit" imaging useful in explaining the results depicted in FIGS. 2 and 3, and the optical principle involved.

The mask configurations of FIG. 3, and the discussion of FIG. 4 suggest that an optical aperture can be synthesized by a plurality of components of the type shown in FIG. 6 properly arranged in the space normally occupied by the lens of a camera system, so that these component elements function, in effect, as elemental parts of the large lens to be synthesized. For this to be accomplished, it is not always necessary to put into each position of the large lens to be synthesized a small element which has both the power which corresponds to that region and also the prismatic effect that corresponds to that region, with wavelength precision, but only to use such elements as may be required to synthesize the "full" spatial frequency range desired. Through use of the just-described preassembled component systems it is possible to take partial resolution component photographs successively, or if desired, the components may be arranged side by side and operated simultaneously, as will be shown later. In other words, it is not necessary that the component systems operate one after another as in the case of dynamic systems.

The nature of the two (or more) element component system having been described, consideration will now be given to the question of how many component systems are needed, or now many "low-resolution" images must be superposed, to synthesize a given aperture. Depending on the spatial frequency content of the scene one wishes to image, one can define the number, types and arrangements of the components sub-systems "required" to synthesize an aperture or lens system in terms of ability to faithfully represent the spatial frequency content in the object it is desired to image. Ideally, this may be most completely accomplished either with the aid of MTF-synthesis graphs, as illustrated in FIG. 3, or with the corresponding "spread Functions". Basically the MTF function to be synthesized is equal to the sum of the MTF functions of the component systems, each of which is equal to the auto-correlation function of the field produced in the "exit pupil" of the component system by point-source illumination. Depending on the focal lengths used, it may be necessary in order to satisfactorily image a given object to completely fill the "real" lens aperture with component sub-systems. In other situations, on the other hand, it may not be necessary to fill the aperture to obtain acceptable imaging and, indeed, the L-shaped aperture used in the experiment illustrated in FIG. 3 was sufficient to represent this particular image in what may be called a "satisfactory" way. In the case of FIG. 3, then, it is known that the aperture to be synthesized need only be of L-shape rather than a full square, and, indeed, how the aperture is synthesized within the "L" is a matter of further choice, subject only to the requirement that both the vertical and horizontal part of the L-shaped aperture must be fully synthesized. To summarize, then, the number and placement of the two-aperture (or more) component systems required to synthesize a given larger aperture is determinable and depends to a large degree upon the resolution required for a given application. It should also be clear that the dimensions of the component apertures "0" and "n" in each of the component systems need not be the same to yield the desired partial frequency range component photographs required to synthesize the full-frequency range image, nor is it necessary that all the "0" apertures have the same dimensions. Similarly, more than two component apertures in each of the component systems of same or of different dimensions may be used for that purpose.

Having established the requirement for two or more apertures in each component system, and general criteria for determining the number required to synthesize a given aperture, a number of system organizations embodying these principles will now be described. Referring to FIG. 7, an optical aperture synthesizing system of the simplest form is shown, mainly by way of introduction to the more complicated systems to be described later, 1and includes a camera 50 having a photographic plate 52 on which the desired scene or object is imaged. The aperture A to be synthesized is represented by the dot-dash line ellipsoid 54. Positioned in front of the "aperture" is a single component system comprising a pair of optical elements designated "0" and "n" supported in a predetermined spaced relationship relative to each other by a frame 38, the nature of which was described in connection with FIG. 6. FIG. 7A illustrates the angular orientation of the two optical apertures and their respective spacings relative to the circumference of the "aperture" A. Means for supporting the component system in the position indicated have been omitted for clarity. From what has been said earlier, when a scene or object is taken through this two-aperture system, a "low-resolution" component image having those spatial frequencies passed by this particular two-aperture system is imaged on the photographic plate 52.

Figure 8:
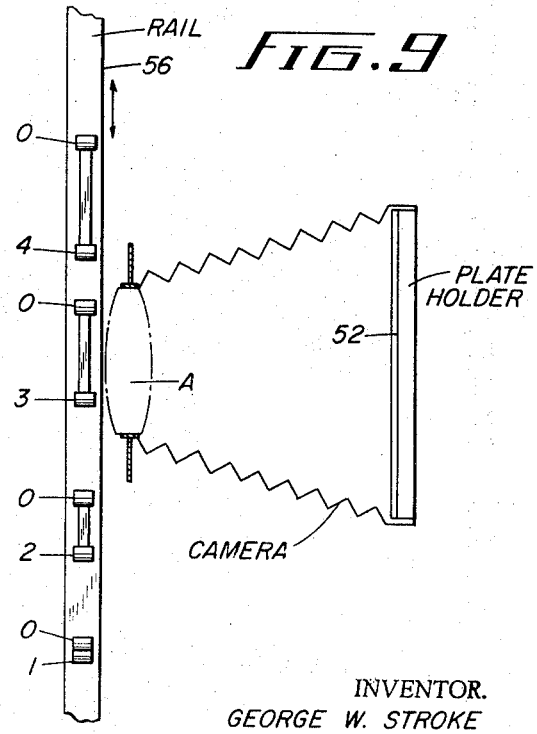
FIG. 8 is an elevation view schematically illustrating an arrangement in which a plurality of component systems are successively brought within the "aperture" to be synthesized.

While the one-component system in FIG. 7 would by itself not produce "satisfactory" resolution in the applications considered, a number of component systems similar to those shown but of different aperture spacing and orientation may be successively placed in front of the aperture A, and the single photographic plate 52 successively exposed through these additional component systems to yield the 'synthesized' "high-resolution" image, much in the manner in which the experiment described in connection with FIG. 3 was performed--and with similar results. FIG. 8 schematically illustrates an arrangement by which a plurality of different component systems, designated 01, 02, 03 and 04, may be brought successively within the "aperture" A to be synthesized. The component systems, each of which is preassembled as described in connection with FIG. 6, are shown as having different spacings between corresponding apertures, and as being carried in front of the "aperture" on a rail system 56, which may be indexed (by means not shown) to successively position the individual component systems in front of the camera. The component images may be taken successively on the same photographic plate 52, in which case "partial frequency range" component images are superposed directly, or the component images may be taken on separate plates (i.e., one plate for each component system) and later put together. The "addition" of the separate films can be rather easily done by successively enlarging the individual component photographs (which, of course, must be carefully matched---using apparatus commerically available) all on the same plate.

It will be recognized that when a system of the type shown in FIG. 8 is used in a moving aircraft, a slightly different scene will be photographed by the successively placed component systems because of the time required to index them in front of the camera, but techniques are known in aerial photography for compensating for such errors, and the embodiments shown for illustration may be readily adapted in such applications.

Figure 9:
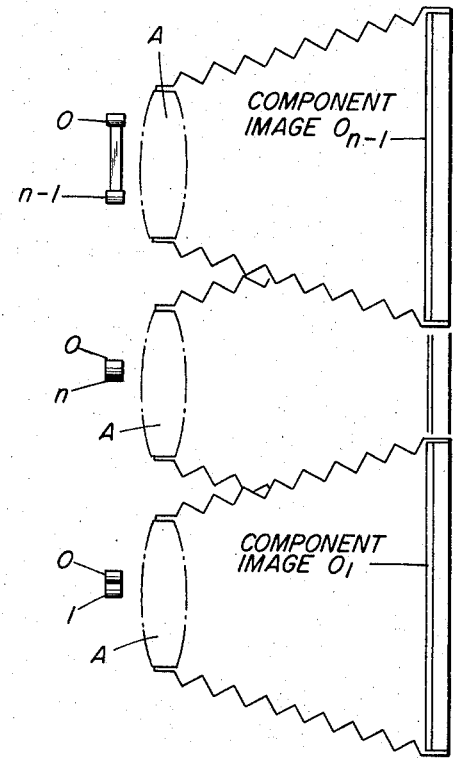
FIG. 9 is a fragmentary elevation view of an arrangement of a plurality of component systems in a spatially separated configuration.
Figure 10A:
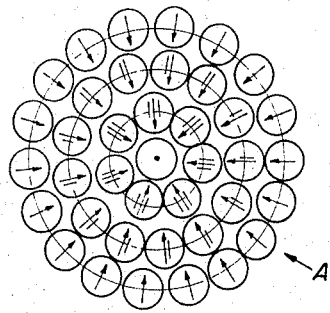
FIG. 10A is a front view of the aperture of the camera of FIG. 10.

Several practical problems, which have arisen in previously proposed systems, inlcuding those resulting from motion, may be readily solved by an array of simultaneously operating component systems as shown in FIG. 9. This system comprises, in effect, a plurality of separate camera systems, each including a camera having a plate holder and an "aperture", and a single two-aperture component positioned in front of the "aperture", arranged in a spatially separated configuration. Although only three of such systems are illustrated, it will be understood that the number "required", applying the tests outlined above, will be present in the array. The individual cameras need not be contiguous, and mirror systems may be used for directing the component images onto their respective plates. This configuration is particularly useful for photographing objects or scenes sufficiently distant that no parallax is observable, within the resolution desired, from the separated positions of the different component systems. It will be noted that the component systems are different for each of the separate camera units in that the apertures have different spacings and/or angular orientation.

With the arrangement of FIG. 9 is is preferable to take all of the component images simultaneously, and then put them together later in the manner described in connection with FIG. 8, or, if the situation should require, the component images may be made successively one at a time, or in groups, and the several component images later combined to synthesize the "high-resolution" image in a single photograph.

Figure 10:
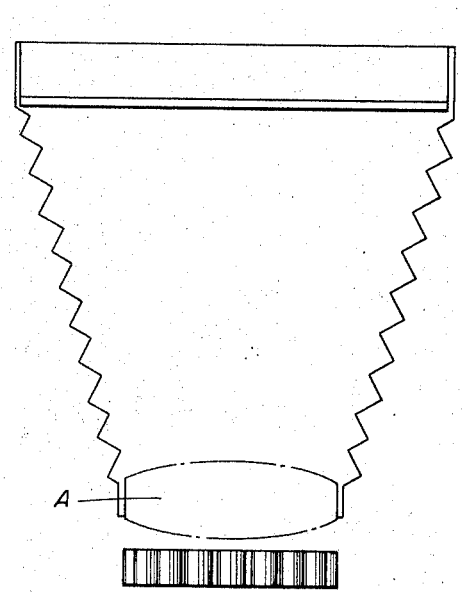
FIG. 10 is a diagrammatic elevation view showing an arrangement for fully synthesizing an aperture with component sub-systems.

FIG. 10 illustrates still another "static" arrangement in which an aperture is fully synthesized with component sub-systems, represented by the small circles, are individual optical elements (e.g., a lens), rather than the "paired" sub-systems described in connection with FIGS. 6-9, and are arranged along concentric circles to essentially completely fill the area of the aperture to be synthesized. Because of the circular symmetry, all of the sub-systems on a given circle have the same optical characteristics, but they differ from circle to circle to simulate the full lens, notably by suitable 'off-axis' mounting. It will be recognized that in this arrangement, any given two sub-systems constitutes a "pair" which satisfies the two-slit analysis presented above, and that each of such "pairs" produces a component image which is added to the component images of all of the other "pairs" in a single photograph. It will thus also be recognized that a "high-resolution" image is obtained even though the lens aperture is not fully filled by the component systems.

As was suggested earlier, the principle of the invention is also applicable to "dynamic" systems; that is, systems in which at least one optical element is movable to "sweep out" the aperture, or suitable parts of it, as it were. In other words, as in the "static" systems, two component sub-systems are required, but only one of them is fixed in position and the other is movable with respect thereto to "scan" out the desired aperture. While it is theoretically possible to apply this principle in the synthesis of a large-aperture lens, inasmuch as the movable element would have to be supported to be moved to any discrete positions, and would further require means for adjusting its optical properties at each of such positions so as to correspond with the characteristics of the corresponding elemental region of the lens to be synthesized, such as a system may be impractical to implement. However, a readily achievable implementation of a "dynamic" system is applicable to a problem of current interest, that of making large diffraction gratings. During the past 10 years, developments toward this goal costing a million dollars or more have achieved an increase in size by only a factor of two. By application of the principles of this invention in a "dynamic" system, it is possible to achieve larger aperture high-resolution gratings than has heretofor been possible.

FIG. 11 diagrammatically illustrates an optical arrangement for dynamically synthesizing a diffraction grating having an aperture labeled A, using one fixed and one movable diffraction grating. Fixedly positioned at one edge of the aperture to be synthesized is a fixed grating $G_0$ and a second movable grating $G_1$ of precisely the same form is supported (by means not shown) to be moved or indexed in a stepwise fashion in a carefully controlled way into positions designated $G_1, G_2, \ldots G_n$, the latter position being at the other edge of the aperture A. With each step, the movable grating is moved a distance equal to its length. It will be noted that in this system the movable optical component has only rectilinear motion, and that its optical properties need not be changed from one position to the other. Thus, the constraints of fractional wavelength tolerance are practicably realizable in this configuration.

The system of FIG. 11 includes in addition to the gratings just described, a source of light 60, the output of which is converged by a lens 62 onto a slit 64, and thence onto a collimating mirror 66 which may be spherical or parabolic in shape, which directs the light as parallel rays onto the "aperture" A. The grating elements $G_0$ and $G_1$ reflect the light incident thereon onto a spherical or parabolic camera mirror 68 which, in turn, focuses the image of the two grating elements onto a photographic plate 70. In operation, successive exposures are made, first with movable grating $G_1$ adjacent fixed grating $G_0$, then with the movable grating moved to a second position spaced from the first a distance equal to the length of the movable grating, and so on, until the aperture to be synthesized is traversed by the movable grating. Just as in the case of the two-slit example, at each position of the movable grating a component, or partial, image is exposed on the photographic plate, the successive "low-resolution images" being superposed on the film 70 to produce an image equivalent to that which would be obtained if the fixed grating extended completely across the aperture A. It can be shown that it is less expensive to synthesize a very large aperture grating in the manner described in FIG. 11 than to attempt to construct a grating of comparable size by assembling a multiplicity of grating elements next to each other.

Although the foregoing discussion has been concerned with the synthesis of lens systems or apertures, in the visible light frequency domain, it is to be understood that the principles of the invention are equally applicable to any type of image-forming system throughout the electromagnetic frequency domain, from X-rays to radio waves, and indeed, the principles are also applicable to acoustical imaging. It is also intended that the terms "aperture to be synthesized", or "lens system to be synthesized", also encompass systems consisting solely or partly of mirrors or diffraction gratings or prisms, or any other device which may be used to obtain an image. And, by "image" it is meant not only images in the sense of an image of a person or of a scene, but also includes images of spectral lines as obtained in spectroscopy and, indeed, any type of signal which appears in the form of an intensity distribution on a photographic plate. In short, the invention has broader applicability than in the specific examples selected for illustration of the optical principle involved.

In the previous discussion, a number of ways have been suggested for superposing the component images; for example, by successive exposure of a single photographic plate, or by successive exposure of a single plate from a number of separately obtained component images. In either process, because the final photograph consists of the summation of partially resolved images, there exists what is known as "low-frequency background", also called "low-frequency redundancy". This is evident in the photograph of FIG. 3, and means that in regions of the picutre where the partial images do not resolve all of the lines, background is nonetheless added. This means that if the missing frequencies were to be put into that region, they would not add onto a completely white background, but rather, would add onto a background where there is some grey. While this, at first impression, may be thought a disadvantage of the process, it is quite easy to suppress the effect of the background. In the case of a photograph synthesized on a single plate by successive exposures of an original scene, the background (grey) can be suppressed to a substantial degree by the standard photographic technique of high-contrast processing. In the case of the assembly of a number of many partial images into a single photograph, two methods are available to suppress the low frequency background: one consists of suitably processing each of the component photographs by high-contrast processing techniques which automatically suppresses the low frequency background in the individual images, and then combining the "filtered" photographs into a single "high-resolution" image.

Figure 12:
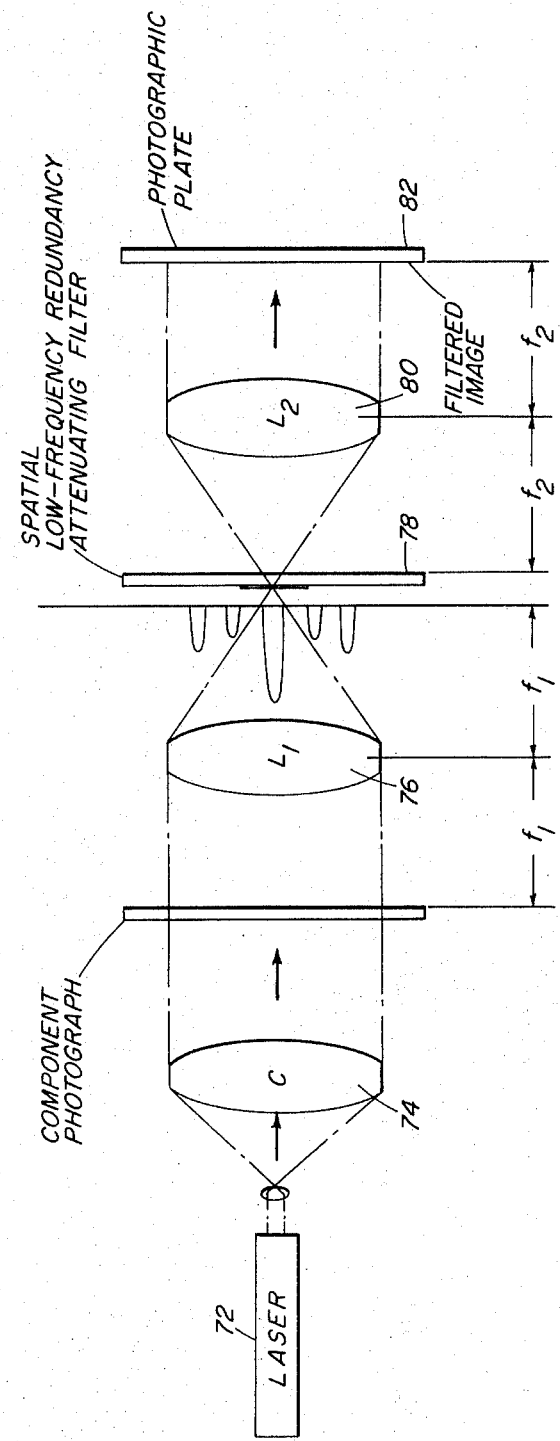
FIG. 12 is a schematic diagram of a system for suppressing low-frequency redundancy in component images.

Another, more elegant, technique for suppressing background, known as "spatial frequency filtering", is diagrammaticaly illustrated in FIG. 12. According to this technique, the low frequency redundancy of the individual partial images is removed by successively placing each of the component photographs in a collimated beam of coherent light derived, for example, from a laser 72 and a suitable collimating lens 74. The component photograph is located at one focus of a second lens 76 (also designated $L_1$) which produces in its focal plane a spectrum of the spatial frequencies in the component photograph. By placing a suitable spatial low-frequency redundancy attenuating filter 78 at the focal plane, which may consist simply of a glass plate having a centrally located suitably deposited 'spot' to attenuate the low spatial frequencies, and then reimaging the spectrum with a second collimating lens 80 ($L_2$) onto a photographic plate 82, the image appearing on the photographic plate will not include the low-frequency redundancy. The filtered images of the several component photographs are then combined, in the manner described earlier, to produce the "high-resolution" image in a single photograph, in which the low frequency background will no longer be present. The problems characteristic of the use of lasers in spatial filtering may be readily minimized, for the purpose of high-resolution synthesis, with arrangements of the type described in U.S. Pat. No. 3,482,102 of C. L. Thomas. Well known incoherent light spatial filtering methods, including apodisation arrangements, may be preferable.

From the foregoing, it will be apparent that applicant has, by relatively simple means, extended to the optical domain the computer-synthesis "synthetic-aperture radio telescope" principle by photographic synthesis of a "high-resolution" image in a single photograph from a number of "partial frequency range" component images, which may be either exposed successively through sets of small apertures onto the single photograph, or derived from a plurality of such partial images exposed simultaneously each through a predetermined set of apertures. The technique permits the synthesis of large aperture lenses, for example, which for technical or manufacturing reasons cannot be fabricated, by the use of a plurality of small optical elements which are readily manufacturable. Moreover, the direct photographic superposition, obtained in incoherent light, avoids the considerable "laser speckle" and other difficulties, such as spurious interference patterns, which tend to plague and to limit the resolution and image quality in coherent optical processing systems, including holgraphy.

I claim:

1. A method for synthesizing the full frequency range spectrum of a photographic image corresponding to the full frequency spectrum of a large-aperture optical image-forming system comprising the steps of:
   forming in incoherent radiation a plurality of partial frequency range spectrum component photographic images each corresponding to different predetermined different elemental portions of the desired large-aperture system, and
   successively summing in incoherent radiation the amplitude components of said plurality of component photographic images in a single latent image to form the desired full-frequency photographic image.

2. A method according to claim 1 wherein said summing step is carried out with incoherent light.

3. A method according to claim 1 wherein said component partial frequency range images are formed with incoherent light and summed with incoherent light.

4. A method according to claim 1 wherein said component partial frequency range images are formed with X-rays and summed with incoherent light.

5. A method according to claim 1 wherein said component partial frequency range images are formed with ultrasonic radiation and summed with incoherent light.

6. A method according to claim 1 wherein said component partial frequency range images are formed simultaneously and later successively summed in a single photographic plate.

7. A method according to claim 3 wherein said component partial frequency range images are formed simultaneously and later successively superposed in a single photographic plate.

8. A method according to claim 1 including the further step of spatial filtering said component partial frequency range images prior to their summation in a single photographic plate for suppressing low-frequency redundancy.

9. A method according to claim 7 including the further step of spatial filtering said component partial frequency range images prior to their summation in a single photographic plate for suppressing low-frequency redundancy.

10. Apparatus for synthesizing an image having the spatial frequency components of a large-aperture optical system using small-aperture components, comprising, in combination,
    a plurality of optical systems each including at least two small-aperture components supported in fixed relationship to each other, the small-aperture components of each of said optical systems being optically different from each other and said systems having optical characteristics corresponding to the optical characteristics of different elemental portions of a larger aperture to be synthesized,
    camera means including a photographic plate; and
    means positioning said plurality of optical systems relative to said camera means for exposure of said photographic plate therethrough to those spatial frequency components of an object as are transmitted by the small-aperture components of said optical systems.

11. Apparatus in accordance with claim 10 wherein each of said optical systems includes a pair of small-aperture components supported in fixed relationship to each other, and wherein each pair of components has an orientation and spacing different from all other pairs.

12. Apparatus in accordance with claim 11 wherein said plurality of optical systems are fixedly supported in predetermined relationship to each other and to said camera means.

13. Apparatus in accordance with claim 10 further including means for transporting individual ones of said plurality of optical systems successively into operative position with said camera means for successive exposure of said photographic plate.

14. Apparatus in accordance with claim 10 wherein said camera means comprises a plurality of individual cameras positioned in an array and each having a respective photographic plate, and wherein one of said optical systems is supported in operative position with a corresponding one of said individual cameras, whereby said plurality of photographic plates may be exposed simultaneously, each to those spatial frequency components of an object as are transmitted by the small-aperture components of its respective optical system.

15. Apparatus in accordance with claim 10, wherein said large aperture to be synthesized is generally circular in shape and said plurality of small-aperture components are arranged in concentric circles and are sufficient in number to substantially fill the area of the large aperture to be synthesized.

16. Apparatus according to claim 15 wherein the optical characteristics of all small-aperture components lying on a given circle are identical but differ from the optical characteristics of components in adjacent circles.

* * * * *